United States Patent
AlSharif et al.

(10) Patent No.: US 12,435,767 B2
(45) Date of Patent: Oct. 7, 2025

(54) STRUCTURAL HEALTH MONITORING OF COMPOSITE STRUCTURES

(71) Applicant: Saudi Arabian Oil Company, Dhahran (SA)

(72) Inventors: Layan Alaeddin AlSharif, Dhahran (SA); Hasan Ali Al-Hashmy, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 499 days.

(21) Appl. No.: 18/074,724

(22) Filed: Dec. 5, 2022

(65) Prior Publication Data
US 2024/0183419 A1 Jun. 6, 2024

(51) Int. Cl.
*F16F 1/36* (2006.01)
*F16L 3/13* (2006.01)
*G01N 3/06* (2006.01)

(52) U.S. Cl.
CPC .............. *F16F 1/361* (2013.01); *F16L 3/13* (2013.01); *G01N 3/066* (2013.01); *F16F 2224/025* (2013.01)

(58) Field of Classification Search
CPC .... F16F 1/361; F16F 2224/025; G01N 3/066; F16L 3/13; G01M 5/0083; G01M 5/0091;
(Continued)

(56) References Cited

U.S. PATENT DOCUMENTS

| 7,472,722 B2 | 1/2009 | Nadarajah et al. |
| 7,921,727 B2 * | 4/2011 | Rice ................. G01M 5/0033 73/762 |

(Continued)

FOREIGN PATENT DOCUMENTS

| CN | 107300435 | 10/2017 |
| EP | 2183330 | 10/2016 |

(Continued)

OTHER PUBLICATIONS

[No Author Listed], "Composite Wrap for Non-Leaking Pipeline Defects," from Natural Gas STAR Partners, United States Environmental Protection Agency, Oct. 2006, 11 pages.

(Continued)

*Primary Examiner* — Daniel J Wiley
(74) *Attorney, Agent, or Firm* — Fish & Richardson P.C.

(57) ABSTRACT

Example devices, systems, and methods for structural health monitoring of composite structures are disclosed. One example method includes attaching a device to an object by fitting the device around the object, where the device includes an enhanced magnetorheological elastomer (MRE) and an elastomer, the enhanced MRE has a folded pattern, the enhanced MRE is embedded in the elastomer, and the device is configured to output a voltage signal generated by the enhanced MRE based on a strain induced on the device in response to deformation. A digital signal is generated based on the voltage signal and using a data processing system, where the data processing system includes a Wheatstone bridge, an amplifier, and an analog-to-digital convertor. A strain value associated with the object is determined based on the digital signal.

20 Claims, 6 Drawing Sheets

(58) Field of Classification Search
CPC .............. G01M 5/0033; G01M 5/0066; B29C 65/4875; B29C 65/4855; B29C 65/489; B29C 65/8284
See application file for complete search history.

(56) References Cited

U.S. PATENT DOCUMENTS

| | | | |
|---|---|---|---|
| 8,726,737 B2 * | 5/2014 | Georgeson | B29C 65/4875 |
| | | | 73/779 |
| 9,057,473 B2 | 6/2015 | Souza | |
| 9,494,474 B2 * | 11/2016 | Servati | A61B 5/1114 |
| 10,481,022 B2 | 11/2019 | Servati et al. | |
| 12,000,740 B2 | 6/2024 | Cao et al. | |
| 2006/0272724 A1 | 12/2006 | Borland et al. | |
| 2010/0154556 A1 * | 6/2010 | Yin | G01B 7/18 |
| | | | 73/779 |
| 2015/0185128 A1 | 7/2015 | Chang et al. | |
| 2017/0160243 A1 | 6/2017 | Zhang et al. | |

FOREIGN PATENT DOCUMENTS

| | | |
|---|---|---|
| EP | 3346265 | 7/2018 |
| WO | WO 2018195295 | 10/2018 |

OTHER PUBLICATIONS

Arronche L., et al. "Impact damage sensing of multiscale composites through epoxy matrix containing carbon nanotubes," Journal of Applied Polymer Science, 2012, 128(5): 2797-2806, 10 pages.

Bastola et al., "Recent progress of magnetorheological elastomers: a review," Smart Materials and Structures, Nov. 2020, 29(123002), 27 pages.

Bauhofer, et al., "A review and analysis of electrical percolation in carbon nanotube polymer composites," Composites Science and Technology, 2008, 69(10), 26 pages.

Berasategi et al., "Anisotropic behaviour analysis of silicone/carbonyl iron particles magnetorheological elastomers," Rheologica Acta, May 30, 2020, 59(7), 1 page, (abstract only).

Böger et al., "Load and health monitoring in glass fibre reinforced composites with an electrically conductive nanocomposite epoxy matrix," Composites Science and Technology, 2018, 68(7-8):1886-1894, 24 pages.

Christenson "In Sensors and Transducers," Handbook of Biomechatronics, Academic Press, 2019, (1):61-93, 33 pages.

Davison "Strain Gauges and the Wheatstone Bridge," University of the West of Scotland, 1997, 4 pages.

Djordjevic, "Nondestructive Test Technology for The Composites," Keynote Lecture, The 10th International Conference of the Slovenian Society for Non-Destructive Testing Application of Contemporary Non-Destructive Testing in Engineering, Ljubljana, Slovenia, Sep. 1-3, 2009, 259-265, 7 pages.

Dumitrescu et al., "Corrosion Repair of Pipelines Using Modern Composite Materials Systems: A Numerical Performance Evaluation," energies, MDPI, 2021, 14(615), 25 pages.

Gao, et al., "In situ sensing of impact damage in epoxy/glass fiber composites using percolating carbon nanotube networks," Carbon, Aug. 2011, 49(10): 3382-3385, (abstract only).

Kchit et al., "Electrical resistivity mechanism in magnetorheological elastomer," Journal of Physics D: Applied Physics, Apr. 30, 2009, 42(10), 15 pages.

Kravchenko et al., "Incorporation of plasma-functionalized carbon nanostructures in composite laminates for interlaminar reinforcement and delamination crack monitoring," Journal of Physics and Chemistry of Solids, 2018, 112:163-170, 7 pages.

kyowa-ei.com, [online], "Relations between Transducer Output Signals in Strain and Voltage," Kyowa, available on or before Jan. 23, 2017, via Internet Archive: Wayback Machine URL <http://web.archive.org/web/20230000000000*/https://www.kyowa-ei.com/eng/technical/notes/transducers/strain_voltage.html>, retrieved on Jun. 22, 2023, URL <https://www.kyowa-ei.com/eng/technical/notes/transducers/strain_voltage.html>, 1 page.

Liao et al., "A comprehensive thermo-viscoelastic experimental investigation of Ecoflex polymer," Elsevier, Polymer Testing, Jun. 2020, 86:106478, 25 pages.

Lim et al., "An Overview of Corroded Pipe Repair Techniques Using Composite Materials," World Academy of Science, Engineering and Technology, International Journal of Materials and Metallurgical Engineering, 2016, 10(1), 7 pages.

Liu et al., "Enhanced delamination initiation stress and monitoring sensitivity of quasi-isotropic laminates under in-plane tension by interleaving with CNT buckypaper," Composites Part A: Applied Science and Manufacturing, Oct. 2016, 89, 8 pages.

Lozoya et al., "Design and Implementation of an IoT-Oriented Strain Smart Sensor with Exploratory Capabilities on Energy Harvesting and Magnetorheological Elastomer Transducers," Applied Sciences, Jun. 26, 2020, 10(4387), 28 pages.

Mikhalchan et al., "A perspective on high-performance CNT fibres for structural composites," Carbon, 2019, 150, 79 pages.

Moniruzzaman et al., "Polymer Nanocomposites Containing Carbon Nanotubes," Macromolecules, Jul. 7, 2006, 39(16):5194-5205, 12 pages.

Moucka et al., "Dielectric properties of magnetorheological elastomers with different microstructure," Applied Physics Letters, Mar. 19, 2018, 112(122901), 5 pages.

Nesreddine et al., "Optimization of the geometrical parameters of bonded composite wrap for repairing cracked pipelines," Frattura Ed Integrità Strutturale, Sep. 23, 2018, 46, 11 pages.

Qian et al., "Carbon nanotube-based hierarchical composites: a review," Journal of Materials Chemistry, May 1, 2010, 20(23): 4751-4762.

Samal et al., "Magnetorheological Elastomer Composites: The Influence of Iron Particle Distribution on the Surface Morphology," Macromolecular Symposia, Feb. 20, 2020, 389(1): 1900053, 4 pages.

Schnars U., et al., "Applications of NDT Methods on Composite Structures in Aerospace Industry," Conference on Damage in Composite Materials, Airbus Operations GmbH, Bremen, Germany, Sep. 2006, 11(12), 11 pages.

Thostenson et al., "Carbon Nanotube Networks: Sensing of Distributed Strain and Damage for Life Prediction and Self Healing," Advanced Materials, Oct. 2006, 18(21): 2837-2841, 6 pages, abstract only.

Castano et al., "Smart fabric sensors and e-textile technologies: a review," Smart Materials and Structures, Apr. 2014, 23:053001, 28 pages.

SAIP Examination Report in Saudi Arabian Appln No. 123450932, dated Sep. 28, 2024, 11 pages.

* cited by examiner

STRUCTURAL HEALTH MONITORING OF COMPOSITE STRUCTURES

TECHNICAL FIELD

The present disclosure relates to devices, systems, and methods for structural health monitoring of composite structures.

BACKGROUND

Structure health monitoring of composite structures can involve components that include specialized equipment and supporting systems, as well as networks of individual sensors that may be sensitive to environmental changes. These components may not adapt to structures of different sizes, for example, composite pipes with different diameters. Additionally, some of these components may be rigid components that can induce damage in structures with non-metallics.

SUMMARY

The present disclosure involves devices, systems, and methods for structural health monitoring of composite structures. One example method includes attaching a device to an object by fitting the device around the object, where the device includes an enhanced magnetorheological elastomer (MRE), an elastomer, a first conductive knit fabric, and a second conductive knit fabric, where the enhanced MRE has a folded pattern, the enhanced MRE is embedded in the elastomer, the first conductive knit fabric is disposed at a first end of the elastomer, the second conductive knit fabric is disposed at a second end of the elastomer, the first conductive knit fabric and the second conductive knit fabric are configured to output a first voltage signal between the first conductive knit fabric and the second conductive knit fabric, the first voltage signal is generated by the enhanced MRE based on a strain induced on the device in response to deformation. A digital signal is generated based on the first voltage signal and using a data processing system, where the data processing system includes a signal conditioning module and an analog-to-digital convertor, where the signal conditioning module includes a Wheatstone bridge and an amplifier, where an input end of the Wheatstone bridge is connected to the first conductive knit fabric and the second conductive knit fabric, an output end of the Wheatstone bridge is connected to an input end of the amplifier, the Wheatstone bridge is configured to output a second voltage signal that has higher signal-to-noise ratio and higher resolution than the first voltage signal, and the amplifier is configured to output a third voltage signal that has higher voltage reading than the second voltage signal. An input end of the analog-to-digital convertor is connected to an output end of the amplifier, and the analog-to-digital convertor is configured to output the digital signal based on the third voltage signal. A strain value associated with the object is determined based on the digital signal.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

This specification relates to structural health monitoring (SHM) of composite structures using in-situ smart devices. The sensing mechanism of the smart device is based on an enhanced smart material (magnetorheological elastomer) that undergoes a change in resistivity when strained. The smart SHM device can include a soft elastomer that can be fitted around an object, for example, a pipe, so that the smart device can serve as a structural health monitoring device to provide non-destructive monitoring of non-metallics of different sizes in unstructured and changing environments. The smart SHM device can be connected to a data acquisition and processing system to correlate the change in strain with rupture risk of the object the device is fitted around. The smart device can have many applications including but not limited to aerospace, marine exploration, construction, or oil and gas. It can be used on composite pipe adhesive joints, composite wraps on metallic or nonmetallic structures, or structural health monitoring during the operation phase of composite structures.

Magnetorheological elastomers (MREs) are a class of smart materials whose mechanical and rheological properties can be changed in the presence of an external magnetic field. The MRE is composed of magnetic particles dispersed in a non-magnetic polymetric matrix. The choice of matrix impacts the mechanical properties of the MREs such as the modulus and MR effect. Silicone rubber is a matrix material because it is highly deformable, non-toxic, less temperature sensitive, and available as resin (in liquid state) that enables an easy homogeneous dispersion of magnetic particles during manufacturing. Additionally, carbonyl ionic particles (CIPs) can be used as the filler material for MREs. The conductivity of an MRE depends on the contact resistance between its filler particles. When these filler particles get closer, they form conducting paths through the material.

In the fabrication of MREs, different additives can be used to enhance or change certain material properties. For example, carbon nanotubes, which are long cylinders of covalently bonded carbon atoms, can be used as nanofillers to increase the electrical conductivity of composites. Some nanotubes are stronger than steel, lighter than aluminum, and more conductive than copper.

Figure 1:
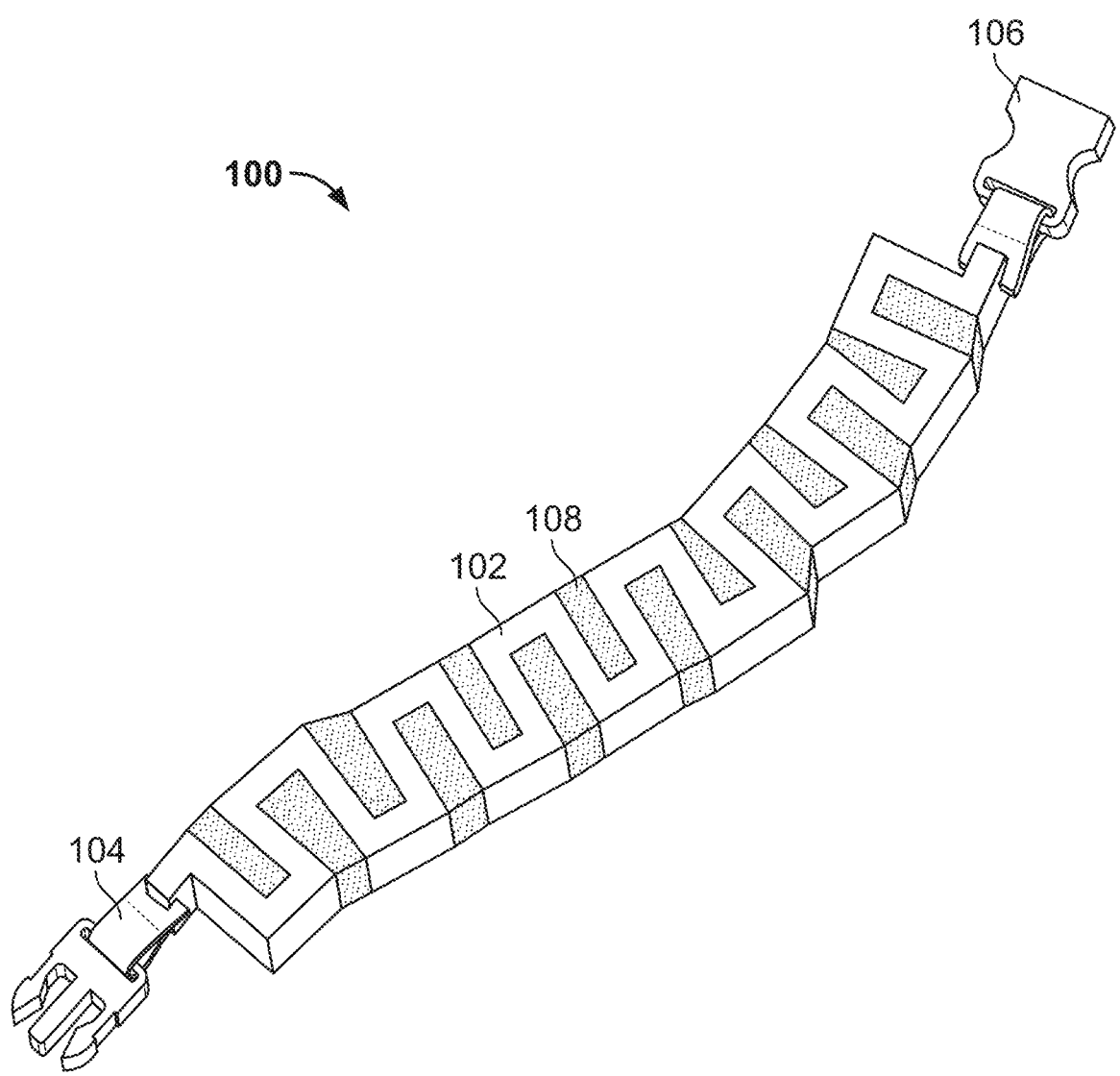
FIG. 1 illustrates an example of a smart SHM device for detection of deformation in composite structures.

FIG. 1 illustrates an example of a smart SHM device 100 for detection of deformation in composite structures. In some implementations, device 100 is composed of an enhanced MRE 102 that is embedded with a folded pattern into an elastomer, for example, silicone 108, conductive knit fabric 104 placed at each end of device 100, and buckle 106 joined to each end of conductive knit fabric 104 to allow the two ends of device 100 to attach to each other. The strain sensing mechanism is based on enhanced MRE that undergoes a change in resistivity when strained. The enhanced MRE 102 can improve sensitivity to strain induced on device 100 in several ways. MRE can be enhanced with multiwall carbon nanotubes (MWCNT) during the fabrication of enhanced MRE 102. Furthermore, enhanced MRE 102 is manufactured to resemble a strain gauge. Its high folding dimensionality can detect with high resolution a change in resistivity for a given strain. Additionally, having only the folded pattern composed of MRE rather than having the entire elastomer composed of MRE gives directionality by restricting the conductive path through device 100. By confining the conductive area to enhanced MRE 102, the mobility of CIPs is restricted. If the entire device 100 was composed of MRE, there could be too many conductive paths, causing a variation in resistance in many directions.

Figure 2:
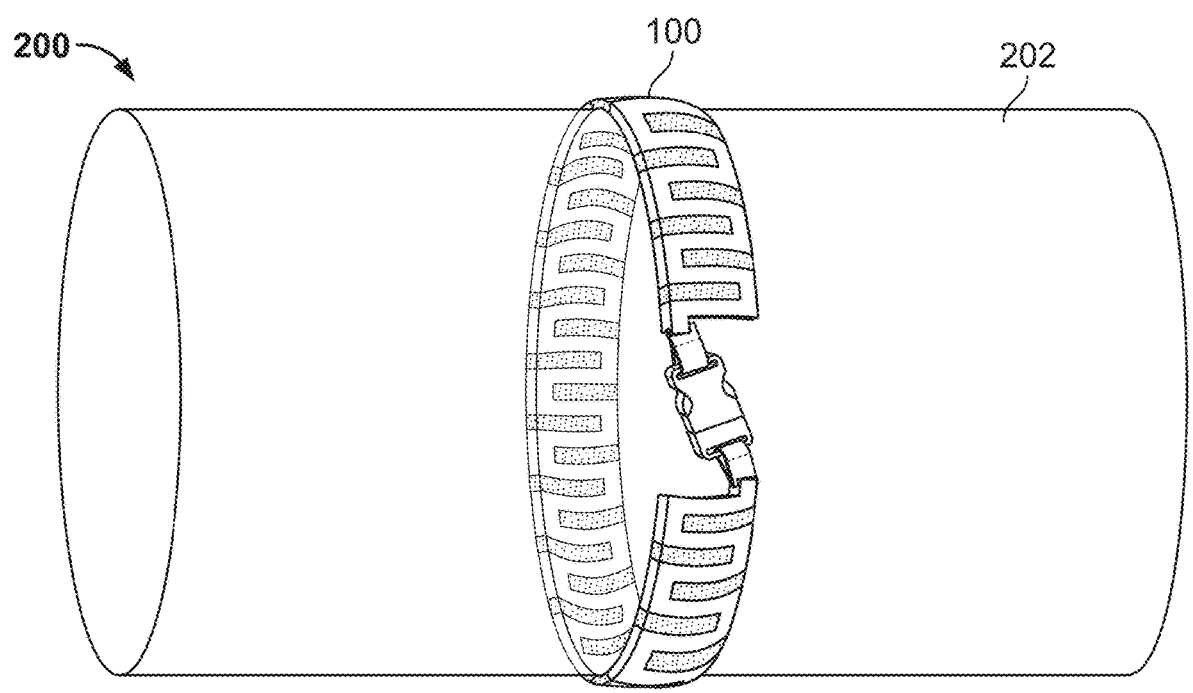
FIG. 2 illustrates an example of using smart SHM device as a strain gauge to detect deformation of pipe.

FIG. 2 illustrates an example 200 of using smart SHM device 100 as a strain gauge to detect deformation of pipe 202. Pipe 202 can be a composite pipe. As shown in FIG. 2, device 100 can be fitted around pipe 202 using buckle 106 to serve as a structural health monitoring device. Device 100 can be adjusted to fit pipes with different diameters. When pipe 202 expands, it induces strain in device 100 that hugs it. In some implementations, pipe 202 can be exposed to a variety of external loads during its service and these loads can cause pipe 202 to deform. These external loads can cause temperature effects, vibration, and weight effects on pipe 202. One of the external loads is internal pressure. Due to the inertia effect, pipe 202 will resist the internal pressure force, inducing a circumferential strain in its wall. The induced strain can be captured by smart SHM device 100 through enhanced MRE 102, which can undergo a change in resistivity in response to strain applied to silicone 108 that enhanced MRE 102 is placed on. Device 100 can act as a transducer by converting the induced strain into electrical resistance, in order to monitor the entire diameter of pipe 202, alerting for a possibility of rupture, regardless where on pipe 202 the rupture initiates. Device 100 can also act as a cushion to protect pipe 202 from external damage.

Figure 3:
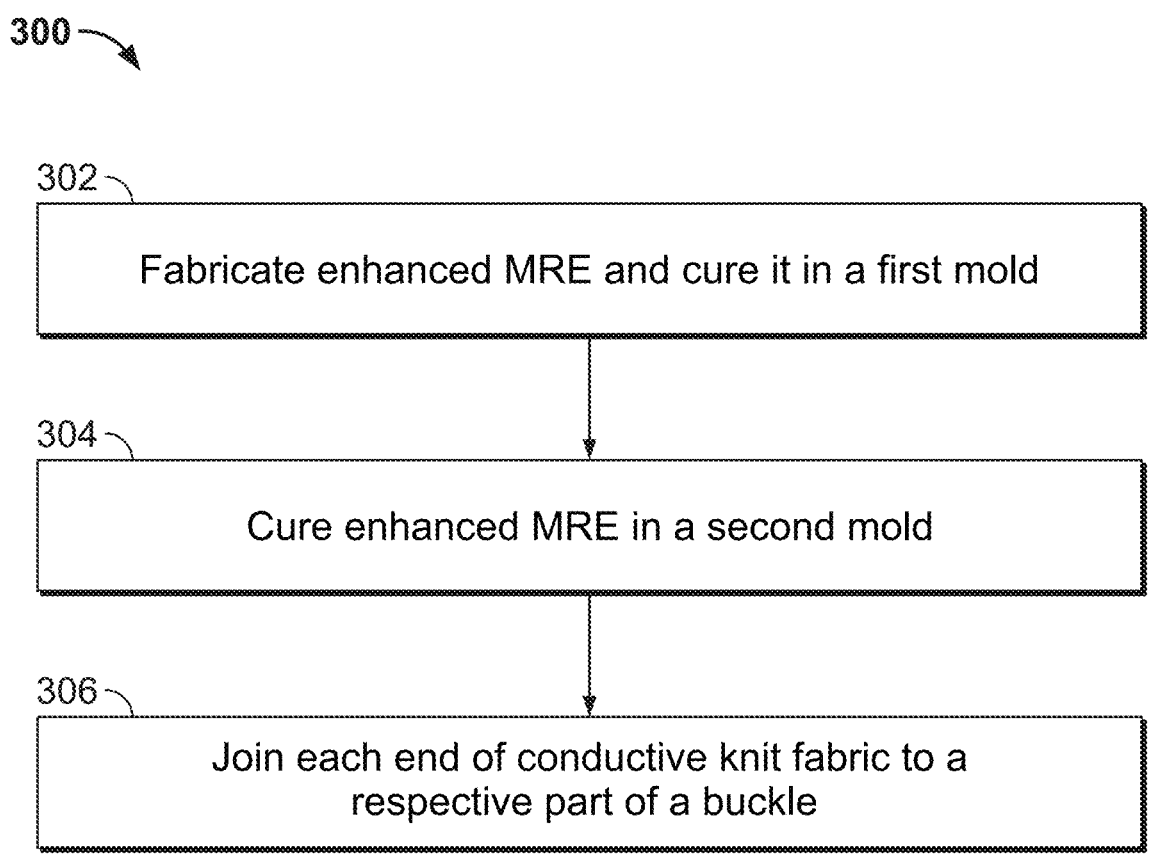
FIG. 3 illustrates an example flow diagram of a fabrication process for manufacturing smart SHM device.

FIG. 3 illustrates an example flow diagram of a fabrication process 300 for manufacturing device 100. At 302, enhanced MRE 102 is fabricated and cured in a first mold. The fabrication of enhanced MRE 102 can include mixing 20-30 percent by weight (wt %) of CIP powder and 1-3 wt % multiwall carbon nanotubes (MWCNTs) with uncured silicone. The mixture can be used to ensure the dispersion of the CIPs into the elastomer. Epoxidized palm oil (EPO) can be utilized as a medium to disperse CIPs and MWCNTs. Then the mixture can be poured into the first mold to produce the folded pattern shape of enhanced MRE 102. The filled first mold can be cured in an oven at a temperature, for example, 70° C., for a period of time such as 2 to 3 hours. The mixture of 20-30 wt % for the CIP powder and 1-3 wt % for MWCNTs can provide a balance between enhancing the MRE's properties while maintaining an appropriate stiffness. When the concentration of CIPs increases, the material viscosity also increases, making it harder for CIPs to align themselves and create conductive paths in device 100. Since device 100 works as a strain sensor, it can have a relatively low stiffness in order to stretch when a strain is induced onto device 100. To increase the sensitivity of device 100 to induced strain, MREs can be enhanced to produce enhanced MRE 102. Electrical conductivity of MRE with iron oxide nanoparticles could be too small to exhibit the behavior of a potential transducer. However, the addition of carbon nanotubes with iron can result in sensing of induced strain with enhanced sensitivity. Therefore including nanotubes into MREs can achieve enhance sensitivity of device 100 to induced strain.

At 304, enhanced MRE 102 is cured in a second mold. Once enhanced MRE 102 is cured and removed from the first mold, it is fitted into a second mold. In some implementations, the second mold can be a rectangular mold. Uncured silicone can be poured on top of enhanced MRE 102 to fill up half the mold depth. Conductive knit fabric 104 can be placed at each end of device 100. The second mold can be left to cure in the oven for a period of time, for example, two to three hours, at a temperature such as 70° C. Then silicone can be added to the second mold until the silicone fills up the second mold fully. Next the second mold can be placed in an oven to cure enhanced MRE 102 for a period of time, for example, two to three hours, at a temperature such as 70° C. Once enhanced MRE 102 is cured and removed from the second mold, the composite structure in device 100 is formed.

At 306, each end of conductive knit fabric 104 can be joined to a respective part of buckle 106.

Figure 4:
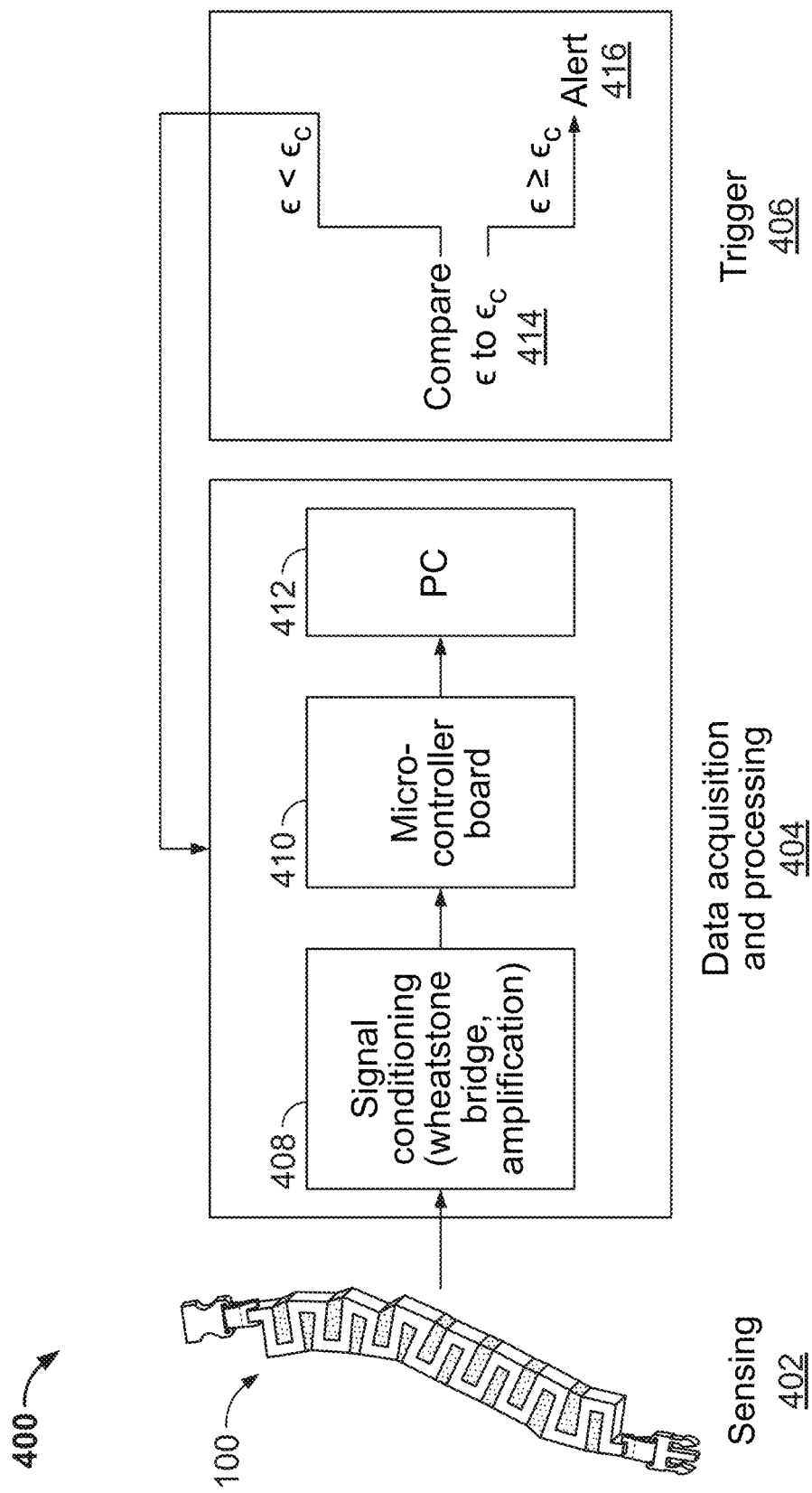
FIG. 4 illustrates an example of a system for processing the output signal from smart SHM device.

FIG. 4 illustrates an example 400 of a combination of data acquisition and processing system 404 and trigger system 406 used to process the output signal from device 100. In order for device 100 to relay strain information via changes in its output of resistance, data acquisition and processing system 404, an external electronic system for data acquisition and processing, is paired with device 100.

As shown in FIG. 4, device 100 is connected to the data acquisition and processing system. The output of device 100 is an electrical signal, which undergoes a signal conditioning stage 408 prior to being digitized by a data processing system that can include microcontroller board 410 and PC 412. The signal conditioning stage 408 can include signal amplification and a Wheatstone bridge which work to improve sensing resolution and improve signal-to-noise ratios.

In some implementations, two alligator clips can connect conductive knit fabric 104 at each end of device 100 to data acquisition and processing system 404. Therefore conductive knit fabric 104 acts as the electrodes of device 100. The wires from the two alligator clips can be connected to a breadboard with a Wheatstone bridge configuration in signal conditioning module 408. The voltage signal outputted by the Wheatstone bridge can be passed through a differential amplifier circuit in signal conditioning module 408 to increase the output voltage reading. The breadboard and the amplifier circuit are connected to microcontroller board 410, for example, an Arduino Uno, that can supply an excitation voltage, for example, 5V, and convert the analog output signal to digital data that can be displayed on PC 412.

In some implementations, initially the Wheatstone bridge is balanced and there is zero output voltage. Any changes in the strain gauge resistance outputted by device 100 can unbalance the Wheatstone ridge and produce a nonzero voltage output from the Wheatstone bridge. Since an initial offset voltage may exist when device 100 is first installed around the pipe, calibration is required. The initial offset voltage can be accounted for in PC 412 using buffered offset nulling, which adds an adjustable DC voltage to the output of the amplifier circuit in signal conditioning module 408. To correlate the change in resistance of the output of device 100 with pipe 202's expansion that leads to induced strain in device 100, a gage factor can be established.

In some implementations, since the output of the data acquisition and processing system is a voltage measurement represented by $V_{out}$ in Equation 1 below, the following relation can be used:

$$V_{out} = \tfrac{1}{4} K_s V_{in} \epsilon \quad (1),$$

where $K_s$ is the gage factor, $V_{in}$ is the excitation voltage, and $\epsilon$ is the strain. The strain value ($\epsilon_c$) can be a critical strain value that causes pipe rupture. The critical strain value can be predetermined by experiments that correlate induced strain with rupture. For example, tensile testing under pressurization can be performed to determine the critical strain value. Test tubes can be placed in an apparatus which enables the test tubes to be pressurized under an axial load. The test tubes can be subject to increased pressure until failure. Each test tube can be equipped with four strain gauges placed at the test tube's center 90 degrees apart from each other on the exterior surface of the test tube. Strain and pressure data can be automatically recorded. The strain at rupture can be determined from the obtained stress-strain curves.

In some implementations, once the gage factor is obtained, it can be used with Equation 1 to obtain the strain value E. Rearranging Equation 1 yields:

$$\epsilon = \left(\frac{4}{V_{in} K_s}\right) V_{out} = \text{constant} \times V_{out}, \quad (2)$$

where $V_{out}$ is the reading outputted from PC 412. Therefore, the value of $\epsilon$ can be obtained in terms of the output voltage of the data acquisition and processing system. The instantaneous strain can be computed by data acquisition and processing system 404.

In some implementations, in order to establish a gage factor $K_s$, an initial calibration can be performed. In the initial calibration test, a known voltage $V_{in}$ is supplied, device 100 is stretched by a specific distance $\Delta L$, and the output voltage $V_{out}$ is recorded. The induced strain E is obtained by:

$$\epsilon = \Delta L/L \quad (3),$$

where L is the initial length of device 100 before it is stretched.

Accordingly, the gage factor $K_s$ can be obtained by re-arranging Equation 1 and substituting the values:

$$K_s = 4 \times V_{out}/(V_{in} \times \epsilon) \quad (4),$$

where $V_{out}$ and $V_{in}$ are the experimental values, and $\epsilon$ is the strain obtained by Equation 3.

In some implementations, a trigger system 406 can be established. As shown in FIG. 4, the strain value $\epsilon$ outputted by data acquisition and processing system 404 enters trigger system 406 where the strain value $\epsilon$ is evaluated. When the strain value $\epsilon$ calculated by Equation 2 is greater than or equal to the critical strain value, an alert is triggered. If the strain value $\epsilon$ is less than the critical strain value, no additional actions are taken and the monitoring device remains active.

Figure 5:
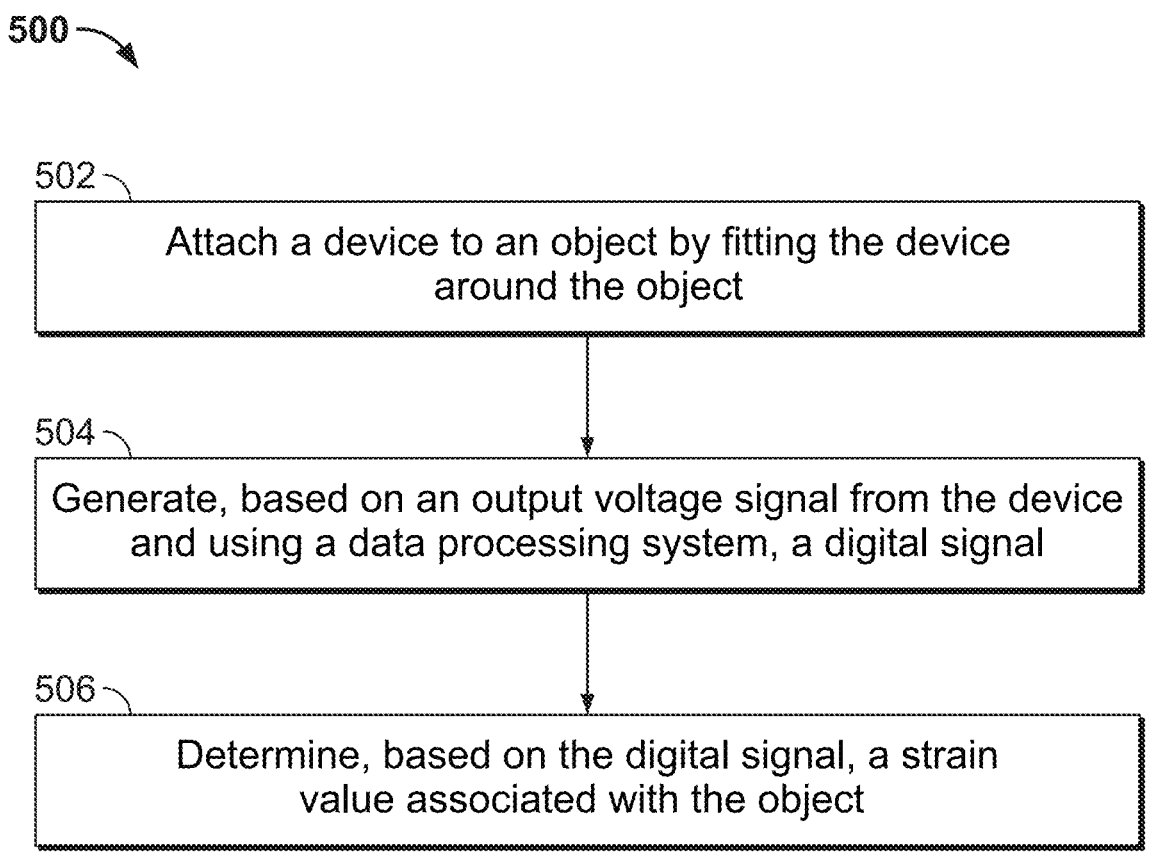
FIG. 5 illustrates an example process of determining the strain of an object using smart SHM device fitted around the object.

FIG. 5 illustrates an example process 500 of determining the strain of an object using a device fitted around the object.

At 502, as described in more detail with respect to FIGS. 1 and 2, a device is attached to an object. Attaching the device to the object can be done by fitting the device around the object.

At 504, as described in more detail with respect to FIG. 4, a digital signal is generated based on an output voltage signal from the device and using a data processing system such as data acquisition and processing system 404 in FIG. 4.

At 506, as described in more detail with respect to FIG. 4, a strain value associated with the object is determined based on the digital signal.

Figure 6:
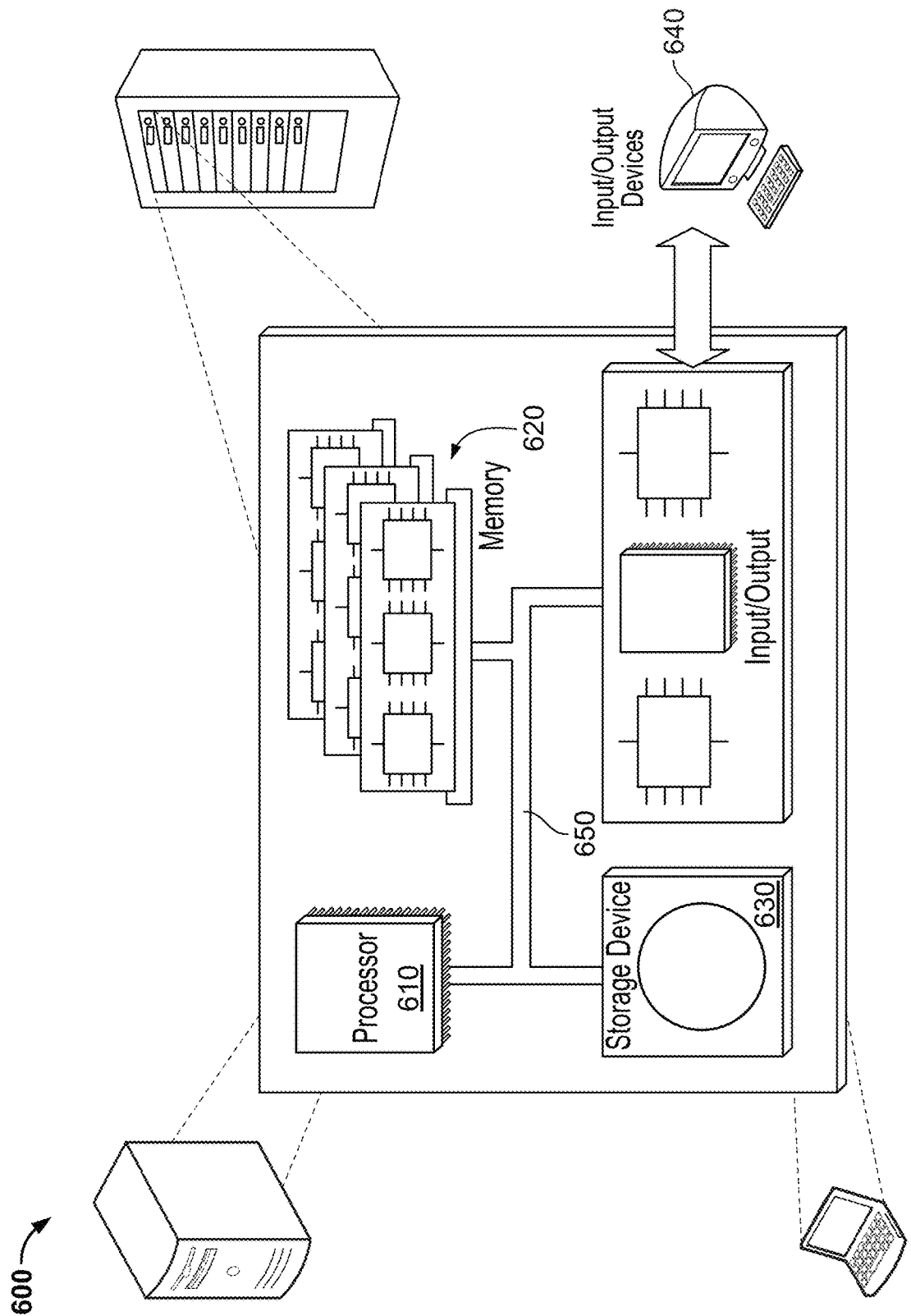
FIG. 6 is a schematic illustration of example computer systems that can be used to execute implementations of the present disclosure.

FIG. 6 illustrates a schematic diagram of an example computing system 600. The system 600 can be used for the operations described in association with the implementations described herein. The system 600 includes a processor 610, a memory 620, a storage device 630, and an input/output device 640. The components 610, 620, 630, and 640 are interconnected using a system bus 650. The processor 610 is capable of processing instructions for execution within the system 600. In some implementations, the processor 610 is a single-threaded processor. The processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 is a volatile memory unit. The memory 620 is a non-volatile memory unit. The storage device 630 is capable of providing mass storage for the system 600. The storage device 630 is a computer-readable medium. The storage device 630 may be a floppy disk device, a hard disk device, an optical disk device, or a tape device. The input/output device 640 provides input/output operations for the system 600. The input/output device 640 includes a keyboard and/or pointing device. The input/output device 640 includes a display unit for displaying graphical user interfaces.

Certain aspects of the subject matter described here can be implemented as a device. The device includes an enhanced magnetorheological elastomer (MRE), an elastomer, a first conductive knit fabric, and a second conductive knit fabric, where the enhanced MRE has a folded pattern, the enhanced MRE is embedded in the elastomer, the first conductive knit fabric is disposed at a first end of the elastomer, the second conductive knit fabric is disposed at a second end of the elastomer, the first conductive knit fabric and the second conductive knit fabric are configured to output a voltage between the first conductive knit fabric and the second conductive knit fabric, the voltage is generated by the enhanced MRE based on a strain induced on the device in response to deformation, and the device is configured to fit around an object.

Devices can include one or more of the following features.

In some implementations, the device includes a buckle, where the buckle includes a first part and a second part, the first part of the buckle is connected to the first conductive knit fabric, the second part of the buckle is connected to the second conductive knit fabric, the first part and the second part of the buckle are configured to couple to each other to attach the device to the object by fitting the device around the object, and the device is configured to fit around the object using the buckle.

In some implementations, the object is a pipe.

In some implementations, the enhanced MRE includes a filler material and an additive material, the filler material includes carbonyl ionic particles (CIPs), and the additive material includes multiwall carbon nanotubes (MWCNT).

In some implementations, a weight of the CIPs has a range of twenty to thirty percent by weight of the enhanced MRE.

In some implementations, a weight of the MWCNT has a range of one to three percent by weight of the enhanced MRE.

In some implementations, the elastomer is a silicone elastomer.

Certain aspects of the subject matter described here can be implemented as a System. The system includes a device and a data processing system, where the device includes an enhanced magnetorheological elastomer (MRE), an elastomer, a first conductive knit fabric, and a second conductive knit fabric, where the enhanced MRE has a folded pattern, the enhanced MRE is embedded in the elastomer, the first conductive knit fabric is disposed at a first end of the elastomer, the second conductive knit fabric is disposed at a second end of the elastomer, the first conductive knit fabric and the second conductive knit fabric are configured to output a first voltage signal between the first conductive knit fabric and the second conductive knit fabric, the first voltage signal is generated by the enhanced MRE based on a strain induced on the device in response to deformation, and the device is configured to fit around an object. The data processing system includes a signal conditioning module and an analog-to-digital convertor, where the signal conditioning module includes a Wheatstone bridge and an amplifier, an input end of the Wheatstone bridge is connected to the first conductive knit fabric and the second conductive knit fabric, an output end of the Wheatstone bridge is connected to an input end of the amplifier, the Wheatstone bridge is configured to output a second voltage signal that has higher signal-to-noise ratio and higher resolution than the first voltage signal, and the amplifier is configured to output a third voltage signal that has higher voltage reading than the second voltage signal, an input end of the analog-to-digital convertor is connected to an output end of the amplifier, and the analog-to-digital convertor is configured to output a digital signal based on the third voltage signal.

Systems can include one or more of the following features.

In some implementations, the device includes a buckle, where the buckle includes a first part and a second part, the first part of the buckle is connected to the first conductive knit fabric, the second part of the buckle is connected to the second conductive knit fabric, the first part and the second part of the buckle are configured to couple to each other to attach the device to the object by fitting the device around the object, and the device is configured to fit around the object using the buckle.

In some implementations, the system includes a computer system, where the computer system includes one or more processors and one or more storage devices storing instructions that, when executed by the one or more processors, cause the one or more processors to perform operations including receiving the digital signal from the analog-to-digital convertor, determining, based on the digital signal, a strain value associated with the object, determining that the strain value is greater than or equal to a predetermined critical strain value, and in response to determining that the strain value is greater than or equal to the predetermined critical strain value, sending an alert indicating that a rupture exists in the object.

In some implementations, the object is a pipe.

In some implementations, the enhanced MRE includes a filler material and an additive material, the filler material includes carbonyl ionic particles (CIPs), and the additive material includes multiwall carbon nanotubes (MWCNT).

In some implementations, a weight of the CIPs has a range of twenty to thirty percent by weight of the enhanced MRE.

In some implementations, a weight of the MWCNT has a range of one to three percent by weight of the enhanced MRE.

In some implementations, the elastomer is a silicone elastomer.

Certain aspects of the subject matter described here can be implemented as a method. A device is attached to an object and fitted around the object, where the device includes an enhanced magnetorheological elastomer (MRE), an elastomer, a first conductive knit fabric, and a second conductive knit fabric, where the enhanced MRE has a folded pattern, the enhanced MRE is embedded in the elastomer, the first conductive knit fabric is disposed at a first end of the elastomer, the second conductive knit fabric is disposed at a second end of the elastomer, the first conductive knit fabric and the second conductive knit fabric are configured to output a first voltage signal between the first conductive knit fabric and the second conductive knit fabric, the first voltage signal is generated by the enhanced MRE based on a strain induced on the device in response to deformation. A digital signal is generated based on the first voltage signal and using a data processing system, where the data processing system includes a signal conditioning module and an analog-to-digital convertor, where the signal conditioning module includes a Wheatstone bridge and an amplifier, where an input end of the Wheatstone bridge is connected to the first conductive knit fabric and the second conductive knit fabric, an output end of the Wheatstone bridge is connected to an input end of the amplifier, the Wheatstone bridge is configured to output a second voltage signal that has higher signal-to-noise ratio and higher resolution than the first voltage signal, and the amplifier is configured to output a third voltage signal that has higher voltage reading than the second voltage signal. An input end of the analog-to-digital convertor is connected to an output end of the amplifier, and the analog-to-digital convertor is configured to output the digital signal based on the third voltage signal. A strain value associated with the object is determined based on the digital signal.

Methods can include one or more of the following features.

In some implementations, the method includes determining that the strain value is greater than or equal to a predetermined critical strain value, and in response to determining that the strain value is greater than or equal to the predetermined critical strain value, sending an alert indicating that a rupture exists in the object.

In some implementations, the enhanced MRE includes a filler material and an additive material, the filler material includes carbonyl ionic particles (CIPs), and the additive material includes multiwall carbon nanotubes (MWCNT).

In some implementations, the object is a pipe.

In some implementations, the elastomer is a silicone elastomer.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A device, comprising:
   an enhanced magnetorheological elastomer (MRE);
   an elastomer;
   a first conductive knit fabric; and
   a second conductive knit fabric; wherein:
      the enhanced MRE has a folded pattern;
      the enhanced MRE is embedded in the elastomer;
      the first conductive knit fabric is disposed at a first end of the elastomer;
      the second conductive knit fabric is disposed at a second end of the elastomer;
      the first conductive knit fabric and the second conductive knit fabric are configured to output a voltage between the first conductive knit fabric and the second conductive knit fabric, wherein the voltage is generated by the enhanced MRE based on a strain induced on the device in response to deformation; and
      the device is configured to fit around an object.

2. The device of claim 1, further comprising a buckle, wherein:
   the buckle comprises a first part and a second part;
   the first part of the buckle is connected to the first conductive knit fabric;
   the second part of the buckle is connected to the second conductive knit fabric;
   the first part and the second part of the buckle are configured to couple to each other to attach the device to the object by fitting the device around the object; and
   the device is configured to fit around the object using the buckle.

3. The device of claim 1, wherein the object is a pipe.

4. The device of claim 1, wherein the enhanced MRE comprises a filler material and an additive material, the filler material comprises carbonyl ionic particles (CIPs), and the additive material comprises multiwall carbon nanotubes (MWCNT).

5. The device of claim 4, wherein a weight of the CIPs has a range of twenty to thirty percent by weight of the enhanced MRE.

6. The device of claim 4, wherein a weight of the MWCNT has a range of one to three percent by weight of the enhanced MRE.

7. The device of claim 1, wherein the elastomer is a silicone elastomer.

8. A system, comprising:
   a device; and
   a data processing system; wherein:
      the device comprises:
         an enhanced magnetorheological elastomer (MRE);
         an elastomer;
         a first conductive knit fabric; and
         a second conductive knit fabric; wherein:
            the enhanced MRE has a folded pattern;
            the enhanced MRE is embedded in the elastomer;
            the first conductive knit fabric is disposed at a first end of the elastomer;

the second conductive knit fabric is disposed at a second end of the elastomer;

the first conductive knit fabric and the second conductive knit fabric are configured to output a first voltage signal between the first conductive knit fabric and the second conductive knit fabric, wherein the first voltage signal is generated by the enhanced MRE based on a strain induced on the device in response to deformation; and the device is configured to fit around an object; and the data processing system comprises:
a signal conditioning module; and
an analog-to-digital convertor; wherein:
the signal conditioning module comprises:
a Wheatstone bridge; and
an amplifier; wherein:
an input end of the Wheatstone bridge is connected to the first conductive knit fabric and the second conductive knit fabric;
an output end of the Wheatstone bridge is connected to an input end of the amplifier;
the Wheatstone bridge is configured to output a second voltage signal that has higher signal-to-noise ratio and higher resolution than the first voltage signal; and
the amplifier is configured to output a third voltage signal that has higher voltage reading than the second voltage signal;
an input end of the analog-to-digital convertor is connected to an output end of the amplifier; and
the analog-to-digital convertor is configured to output a digital signal based on the third voltage signal.

9. The system of claim 8, wherein the device further comprises a buckle, wherein:
the buckle comprises a first part and a second part;
the first part of the buckle is connected to the first conductive knit fabric;
the second part of the buckle is connected to the second conductive knit fabric;
the first part and the second part of the buckle are configured to couple to each other to attach the device to the object by fitting the device around the object; and
the device is configured to fit around the object using the buckle.

10. The system of claim 8, further comprising a computer system, the computer system comprising:
one or more processors; and
one or more storage devices storing instructions that, when executed by the one or more processors, cause the one or more processors to perform operations comprising:
receiving the digital signal from the analog-to-digital convertor;
determining, based on the digital signal, a strain value associated with the object;
determining that the strain value is greater than or equal to a predetermined critical strain value; and
in response to determining that the strain value is greater than or equal to the predetermined critical strain value, sending an alert indicating that a rupture exists in the object.

11. The system of claim 8, wherein the object is a pipe.

12. The system of claim 8, wherein the enhanced MRE comprises a filler material and an additive material, the filler material comprises carbonyl ionic particles (CIPs), and the additive material comprises multiwall carbon nanotubes (MWCNT).

13. The system of claim 12, wherein a weight of the CIPs has a range of twenty to thirty percent by weight of the enhanced MRE.

14. The system of claim 12, wherein a weight of the MWCNT has a range of one to three percent by weight of the enhanced MRE.

15. The system of claim 8, wherein the elastomer is a silicone elastomer.

16. A method, comprising:
attaching a device to an object by fitting the device around the object, wherein the device comprises:
an enhanced magnetorheological elastomer (MRE);
an elastomer;
a first conductive knit fabric; and
a second conductive knit fabric; wherein:
the enhanced MRE has a folded pattern;
the enhanced MRE is embedded in the elastomer;
the first conductive knit fabric is disposed at a first end of the elastomer;
the second conductive knit fabric is disposed at a second end of the elastomer; and
the first conductive knit fabric and the second conductive knit fabric are configured to output a first voltage signal between the first conductive knit fabric and the second conductive knit fabric, wherein the first voltage signal is generated by the enhanced MRE based on a strain induced on the device in response to deformation;
generating, based on the first voltage signal and using a data processing system, a digital signal, wherein the data processing system comprises:
a signal conditioning module; and
an analog-to-digital convertor; wherein:
the signal conditioning module comprises:
a Wheatstone bridge; and
an amplifier; wherein:
an input end of the Wheatstone bridge is connected to the first conductive knit fabric and the second conductive knit fabric;
an output end of the Wheatstone bridge is connected to an input end of the amplifier;
the Wheatstone bridge is configured to output a second voltage signal that has higher signal-to-noise ratio and higher resolution than the first voltage signal; and
the amplifier is configured to output a third voltage signal that has higher voltage reading than the second voltage signal;
an input end of the analog-to-digital convertor is connected to an output end of the amplifier; and
the analog-to-digital convertor is configured to output the digital signal based on the third voltage signal; and
determining, based on the digital signal, a strain value associated with the object.

17. The method of claim 16, further comprising:
determining that the strain value is greater than or equal to a predetermined critical strain value; and
in response to determining that the strain value is greater than or equal to the predetermined critical strain value, sending an alert indicating that a rupture exists in the object.

18. The method of claim 16, wherein the enhanced MRE comprises a filler material and an additive material, the filler material comprises carbonyl ionic particles (CIPs), and the additive material comprises multiwall carbon nanotubes (MWCNT).

19. The method of claim 16, wherein the object is a pipe.

20. The method of claim 16, wherein the elastomer is a silicone elastomer.

* * * * *